Nov. 24, 1953 G. F. DALY ET AL 2,660,370

STORAGE DEVICE

Original Filed Oct. 8, 1948 3 Sheets-Sheet 1

INVENTORS
GEORGE F. DALY
F. VALLEE ADAMS
BY Robert S. Dunham
ATTORNEY

Nov. 24, 1953 G. F. DALY ET AL 2,660,370

STORAGE DEVICE

Original Filed Oct. 8, 1948 3 Sheets-Sheet 2

INVENTORS
GEORGE F. DALY
F. VALLEE ADAMS
BY Robert B. Dunham
ATTORNEY

Nov. 24, 1953 G. F. DALY ET AL 2,660,370

STORAGE DEVICE

Original Filed Oct. 8, 1948 3 Sheets-Sheet 3

INVENTORS
GEORGE F. DALY
F. VALLEE ADAMS
BY
Robert I. Dunlan
ATTORNEY

Patented Nov. 24, 1953 2,660,370

UNITED STATES PATENT OFFICE 2,660,370

STORAGE DEVICE

George F. Daly and Francis V. Adams, Endicott, N. Y., assignors to International Business Machines Corporation, New York, N. Y., a corporation of New York Original application October 8, 1948, Serial No. 53,456. Divided and this application September 17, 1952, Serial No. 310,104

2 Claims. (Cl. 235—61)

The present invention has for its general object the provision of an improved and modified storage device adapted for use with record controlled machines and more particularly for use in the record controlled machine shown and described in our copending application, Serial No. 53,456, filed October 8, 1948, of which the present application is a division.

More particularly, the storage devices are in the form of units which are adapted to be reset to zero in the same cycle in which entries are received therein and read out therefrom whereby a separate machine cycle is not required for resetting the storage devices to zero. Accordingly, a new entry of a number to storage may be effected in the immediately following machine cycle. In other words, if there be a readout from a storage device in a given machine cycle, at the end of that cycle, each storage device may be reset and a new entry may be put in the storage device.

A further object of the present invention resides in the provision of a storage means with resettable elements together with a restoring means for concurrently restoring the settable elements and further including latching means for the restoring means with a trip magnet for releasing the locking means and with cam means for positioning the restoring means.

Further and other objects of the present invention will be hereafter pointed out in the accompanying specification and claims and shown in the drawings which by way of illustration show one and a preferred embodiment of the invention.

*Machine drive*

Figure 1:
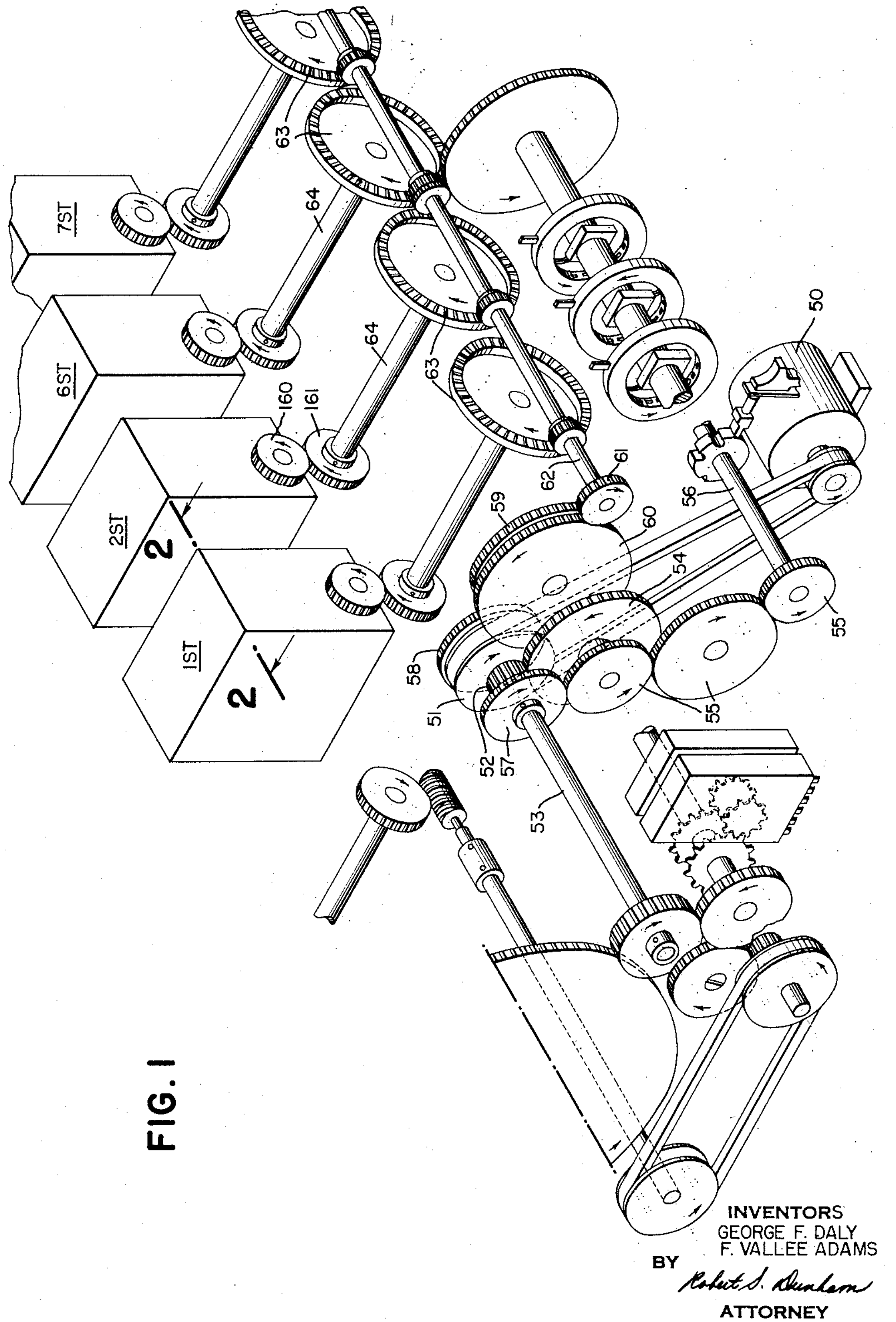
Fig. 1 is a schematic drawing showing diagrammatically the main drive parts of the machine and the mode of drive to the storage units.
Figure 2:
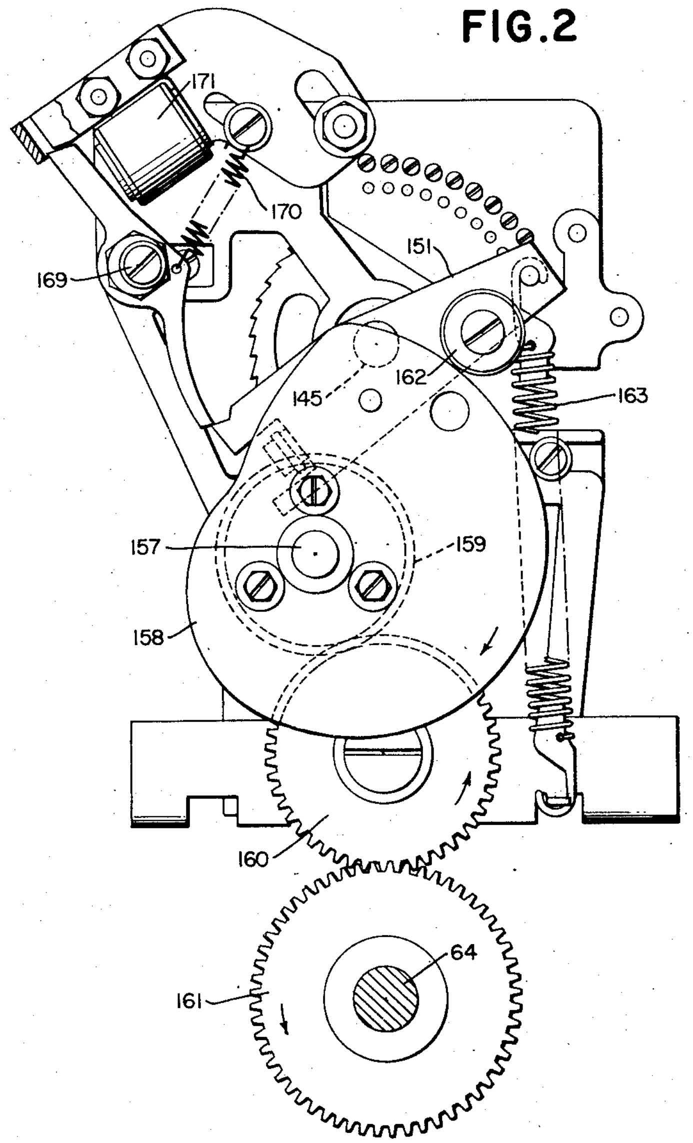
Fig. 2 is an end view of one of the storage units used in the machine. This view is taken substantially on line 2—2 of Fig. 1.

Referring to Fig. 1, the driving motor 50, through the belt and pulley, drives a pulley 51 which is fast to gear 52 which is freely rotatable on a shaft 53. Gear 52 drives the gear 54 which, through gearing generally designated 55, drives a shaft 56. Shaft 56 is the drive shaft for the cam contact devices, one of which is shown. In the actual machine there are 42 of the C-cam contact devices. The upper gear of the 55 gear train drives a gear 57 which is fast on shaft 53; also fast on shaft 53 is gear 58 which, in turn, drives a gear 59 which is fast to a spur gear 60. The spur gear 60 in turn drives a gear 61 fast on shaft 62. Shaft 62, by gearing such as 63, drives storage unit drive shafts such as 64. The storage unit drive shafts 64 make one revolution per machine cycle, or otherwise stated, shaft 64 rotates in unison with shaft 56.

*Storage devices*

Each of the storage units 1ST to 7ST, inclusive, (see Figs. 1, 2, 3 and 4) comprises a group of ten digital contact bars 140 and one blank bar 141. These are mounted at their ends in plates of insulating material 142, so as to be out of contact with each other, and each is provided with an electrical connector. The insulating plates are mounted upon side plates of a frame tied together by cross bars such as 144. The contact bars are arranged in an arc centered at the axis of a shaft 145 journalled in the two side plates. Rotatably mounted on the shaft are a number of rotary storage elements 146, in this case 12, to provide 12 decimal columns of storage. Each storage element has a contact pin 147 mounted on the storage element by a spring 148 and extending through a hole in the storage element, in position to slide over the inner edges of the contact bars. Each supporting spring 148 is electrically connected by a rivet to a contact strip 149 upon which bears wiper 150 supported by a piece of insulation on the cross bar. The wipers pertaining to the different storage elements are electrically connected to binding posts to provide means to complete circuits through the individual storage elements to any of the 10 contact bars on which the contact pins are bearing.

Means are provided to set the storage elements concurrently to make contact with selected contact bars, as determined by differentially timed impulses. For this purpose there are means to rock the 12 storage elements together and to stop them individually in the required different positions. Pinned to the opposite ends of the shaft are two bail arms 151 connected by a cross bar 152. Individual springs 153 hooked into the storage elements and anchored to a comb 154 on the cross bar pull the storage elements counterclockwise (Fig. 4) so that normally a shoulder 155 on each storage element abuts upon a stop formed by a U-shaped rubber member 156 on the upper edge of the cross bar 152.

Another shaft 157, journalled in the side frames of the unit, has fixed to it a cam 158 and a gear 159, the latter being connected through an idler gear 160 with a third gear 161 mounted on the storage unit drive shaft 64 journalled in the frame of the machine. The 64 shaft is continuously driven in the manner previously described. A cam follower roller 162 journalled on the bail arm 151 is held against the cam 158 by a strong spring 163 hooked over a pin on the bail arm and anchored to the frame of the storage unit.

Figure 4:
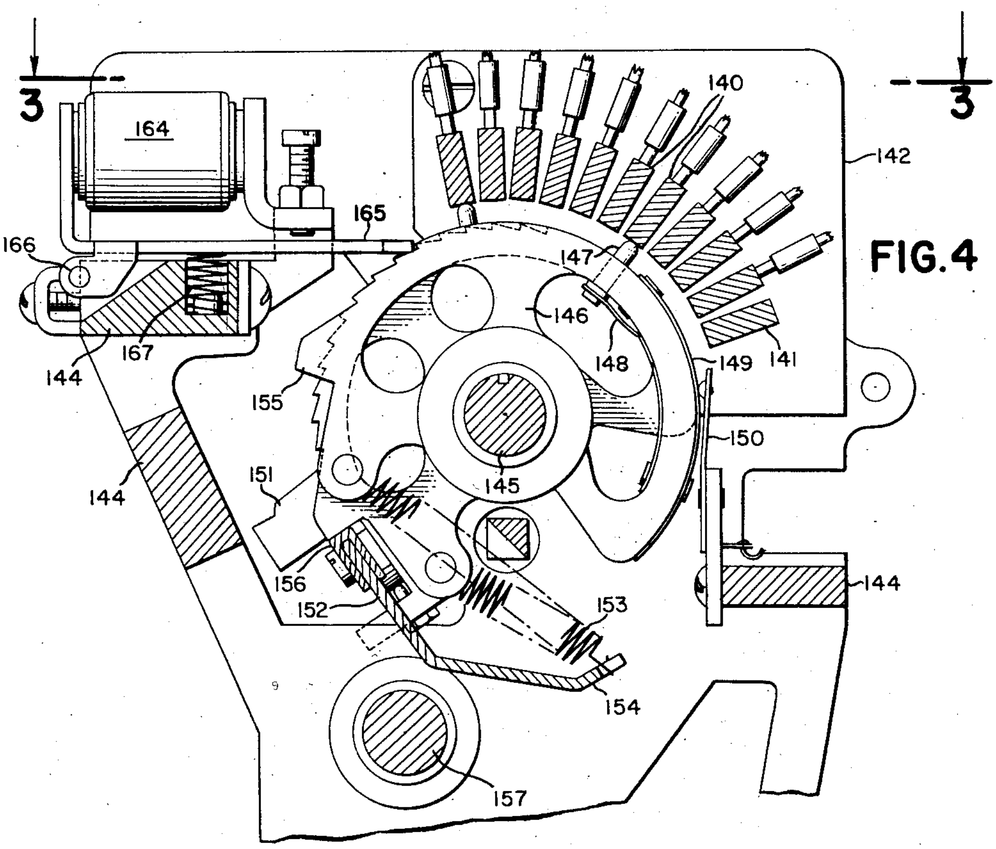
Fig. 4 is a sectional view taken on line 4—4 of Fig. 3.
Figure 3:
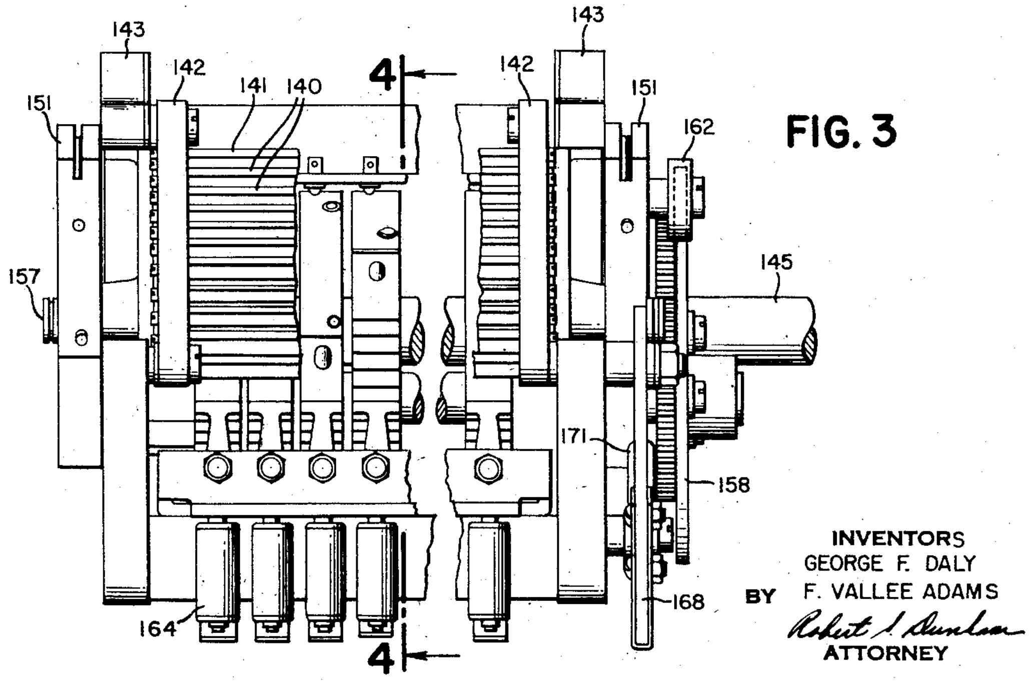
Fig. 3 is a top plan view of one of the storage units. This view is taken on line 3—3 of Fig. 4.

The cam 158 rotates clockwise and during its rise rocks the bail 152 at a rate which causes the contact pins 147 of the storage elements to travel over the contact bars 140—141 in time with the reading of the corresponding index point positions 9 through 0, inclusive. Each storage element has an appertaining storage magnet 164 with an armature 165 pivoted at 166 and extending over into a position to coact with teeth of the related storage element. When a storage magnet 164 is deenergized its armature is tilted by a spring, such as the spring 167, to a position where its right end is just above the teeth of the corresponding storage element. Fig. 4 shows the condition where the front storage magnet in the view has been energized from a 6 index point impulse station, which caused its armature to drop in front of that tooth of the storage element which would stop the storage element in position to leave the contact pin on the number 6 contact bar as shown. Further movement of the bail thereafter simply stretches the spring 153. The next storage element in the rear in Fig. 4 is shown as having moved the maximum distance with the bail, bringing its contact pin onto the 0 contact bail.

When the cam follower 162 rolls onto the highest part of the cam 158 a latch 168 pivoted at 169 is pulled into position to latch the bail, by means of a spring 170. Further rotation of the cam will leave the bail latched with the values stored in the storage unit. The storage unit is reset by energizing a reset magnet 171 at the time the cam follower 162 is on the high part of the cam when pressure of the bail on the latch is relieved. This results in the resetting of the storage unit in a small portion of the latter part of the cycle, as the bail rotates clockwise and picks up the storage elements by their shoulders and returns them to the position where the contact pin bears on the blank contact bar 141. A new amount can be stored in the storage unit immediately on the next machine cycle as the cam follower rides the rise of the cam.

In accordance with the provisions of the patent statutes, we have herein described the principle of operation of the invention, together with the elements which we now consider the best embodiments thereof, but we desire to have it understood that the structure disclosed is only illustrative and the invention can be carried out by other means. Also, while it is designed to use the various features and elements in the combinations and relations described, some of these may be altered and modified without interfering with the more general results outlined.

Having thus described our invention, we claim:

1. A number storage device with settable elements controlled by differentially timed impulses received in one cycle with read-out means controlled thereby from which readout may be effected in following cycles, restoring means normally biased to restoring position to concurrently restore a plurality of said settable elements, means to latch said restoring means in a position in which restoring operations are suppressed, a trip magnet for releasing said latching means to cause said restoring means to restore said settable elements to a position for a new setup upon the immediately following cycle and cam means for positioning said restoring means for permitting the setup of said settable elements.

2. A number storage device comprising a readout with settable sectors therefor for each of a plurality of denominational orders, and with arresting magnets operable by differentially timed impulses for positioning pawls to stop movement of the sectors in read-out position and with a timed operating bail for controlling positioning of said sectors and for restoring the same with cyclically operable means for moving and restoring the bail and including in combination, a single tripping latch magnet for said bail, a latch controlled thereby for latching the bail in advanced position whereby upon energization of said single latch magnet all sectors may be restored to normal position by said bail upon rocking of said bail.

GEORGE F. DALY.
FRANCIS V. ADAMS.

No references cited.